United States Patent
Specht et al.

[11] Patent Number: 6,155,512
[45] Date of Patent: Dec. 5, 2000

[54] SEAT BELT PRETENSIONER

[75] Inventors: Martin Specht, Feldafing; Jürgen Arold, Gemcinde Burgoberbach, both of Germany

[73] Assignee: Breed Automotive Technology, Inc., Lakeland, Fla.

[21] Appl. No.: 09/349,830

[22] Filed: Jul. 8, 1999

[30] Foreign Application Priority Data

Aug. 20, 1998 [DE] Germany ............................ 198 37 927

[51] Int. Cl.[7] .................................................. B65H 75/48
[52] U.S. Cl. ............................. 242/374; 280/806; 60/632
[58] Field of Search ............................. 242/374; 280/806, 280/807; 297/478, 480; 60/632

[56] References Cited

U.S. PATENT DOCUMENTS

| | | | |
|---|---|---|---|
| 4,023,427 | 12/1998 | Beier | 280/806 |
| 5,358,275 | 10/1994 | Föhl | 280/806 |
| 5,397,095 | 3/1995 | Behr | 242/374 |
| 5,553,890 | 9/1996 | Buhr et al. | 242/374 |
| 5,641,131 | 6/1997 | Scmid et al. | 242/374 |
| 5,671,949 | 9/1997 | Bauer et al. | 280/806 |
| 5,772,246 | 6/1998 | Gordon | 280/806 |
| 5,785,634 | 3/1999 | Wohlenberg et al. | 242/374 |
| 5,842,344 | 12/1998 | Scmid | 242/374 |
| 6,089,492 | 7/2000 | Nagata et al. | 242/374 |

FOREIGN PATENT DOCUMENTS

| | | |
|---|---|---|
| 0629531 | of 1994 | European Pat. Off. . |
| 4206093 | of 1993 | Germany . |
| 295 20 307 | of 1996 | Germany . |

*Primary Examiner*—Donald P. Walsh
*Assistant Examiner*—Emmanuel M. Marcelo
*Attorney, Agent, or Firm*—Lonnie R. Drayer

[57] ABSTRACT

A pretensioner for tightening a seat belt has a piston-like drive member arranged in a guide tube. A drive means produces a propellant gas that drives the drive member. A movement transmitting system connects the drive member to the seat belt. A discharge system with a release or rupture element opens a discharge orifice in the drive member during a return movement of the drive member.

14 Claims, 6 Drawing Sheets

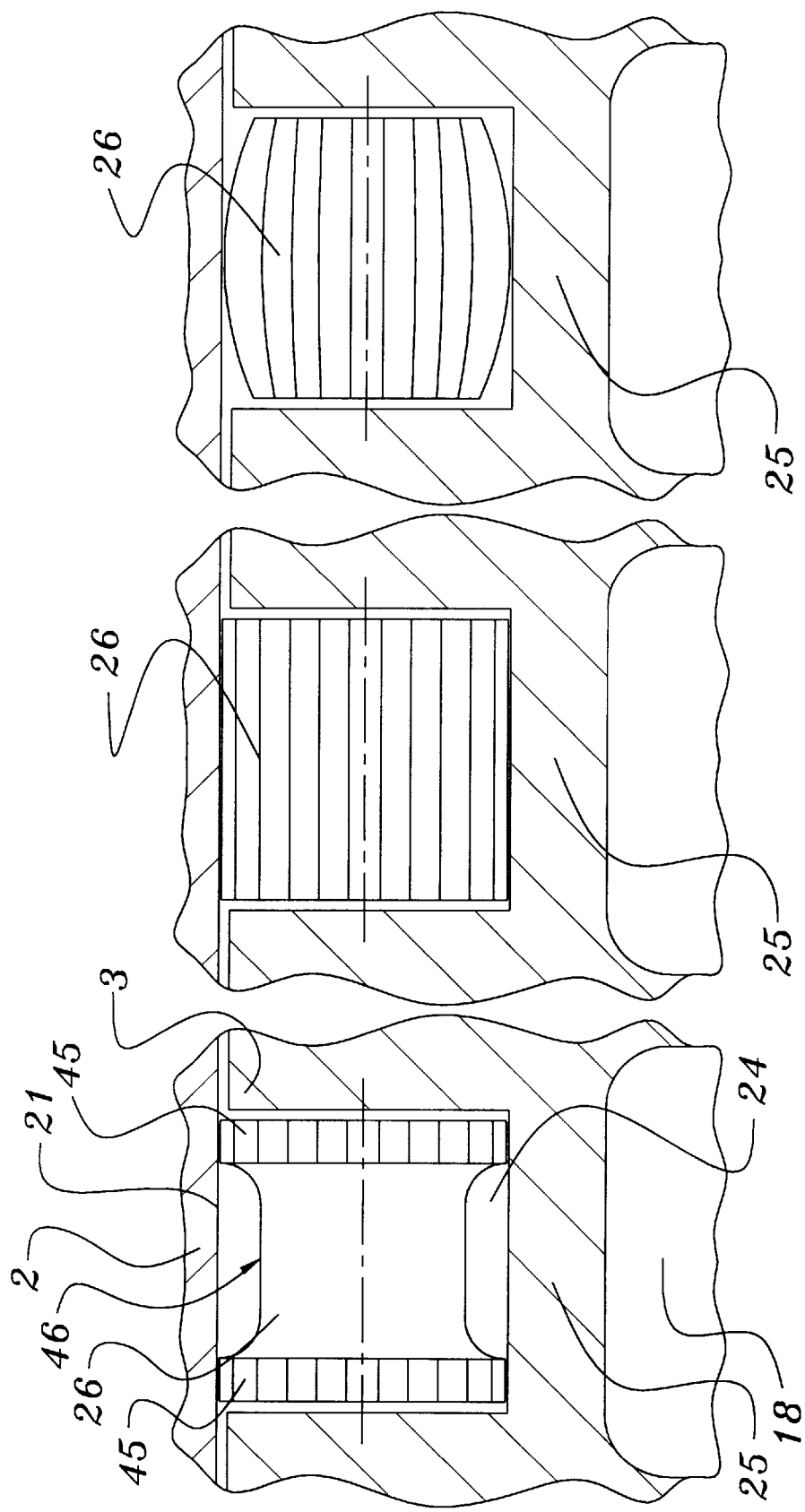

SEAT BELT PRETENSIONER

FIELD OF THE INVENTION

The invention relates to seat belt pretensioner with a piston drive for tightening a vehicle seat belt.

BACKGROUND OF THE INVENTION

During the normal vehicle operation, the seat belt rests loosely on a vehicle occupant's body for reasons of comfort, such that in the even of a crash there is a risk that the vehicle occupant will be forwardly displaced in an excessively vigorous manner, despite the blocking of the spool of the automatic seat belt retractor. The layers of belt webbing on the spool of the automatic seat belt retractor are also wound relatively loosely, so that there is also belt slackness which can lead to excessive forward displacement of the vehicle occupant as a result of a film reeling effect, despite blocking of the spool.

To avoid the risk of excessive forward displacement of the vehicle occupant, it is known, prior to blocking of the spool, to eliminate the belt slackness by means of a pretensioner which acts on the seat belt buckle or on the spool of the automatic seat belt retractor.

DISCUSSION OF THE PRIOR ART

EP 0 629 531 A1 has disclosed a pretensioner with a pyrotechnic piston drive with at least one piston, the driving movement of which is transmitted to the spool of an automatic seat belt retractor. The piston is arranged in a guide tube and is moved therein by a propellant gas produced by a pyrotechnic propellant charge expands in a pressure chamber in the guide tube and thereby acts on the piston. The piston engages a pinion coupled to the spool and sets it in rotation. Once the piston has reached its end position and the seat belt is tightened, the automatic seat belt retractor blocks the belt webbing.

If the pinion is now rotated back in the opposite direction by a pull on the belt webbing, i.e. during operation of a seat belt force limiter, which allows limited extraction of the tightened belt webbing, the piston, which is still connected to the pinion, is moved back. However, the return movement must take place against the propellant gas that is still under pressure in the pressure chamber and is therefore complicated or even impossible.

SUMMARY OF THE INVENTION

An object of the invention is to provide a device of the type mentioned at the outset, which allows a reliable sequence of movements during tightening of the seat belt.

This object is achieved according to the invention with the generic piston drive in that it comprises a discharge system with a release or rupture element which opens a discharge orifice in the drive member during a return movement of the drive member advanced by the propellant gas, through which discharge orifice the propellant gas under pressure in the pressure and expansion chamber issues. The release or rupture element can be brought into its rupture position by the returning drive member or piston itself or by an additional system that is activated during the return movement or return travel of the piston.

The configuration according to the invention ensures that a return movement of the drive member can take place without a significant counteracting pressure force of the propellant gas in the expansion or pressure chamber. Such a return movement of the drive member can occur, for example, if a vehicle occupant falls into the seat belt in the extent of a crash when the automatic seat belt retractor is blocked and the seat belt is unwound again by a certain length as a result of the action of a load limiter, this unwinding being transmitted to the drive member as a return movement.

Advantageous embodiments of the invention are disclosed in the sub-claims.

Advantageously, the rupture element is accommodated in an external chamber of the drive member opened to an internal wall of the guide tube and is brought, during a return movement of the drive member as a result of frictional engagement with the internal wall, into a release position in which the rupture element opens the discharge orifice by opening a partition wall. The rupture element entrained on the piston is therefore invariably in a standby position from which it is immediately brought into its correct rupture position during a reversal of the direction of movement of the piston by a clamping or frictional effect.

In various designs and arrangements, the partition wall can be integrated in the piston, the piston in a preferred configuration having a recessed piston head that allows an advantageous configuration and arrangement of the external chamber with respect to the piston head surrounding the pressure chamber. Different embodiments can be used for the rupture element and a respective external chamber adapted to the rupture element and its sequence of movement. Thus, for example, the rupture element can have a spherical, cylindrical, roller-shape or similar shape, but it must have a surface that provides the necessary frictional force to bring the rupture element into its rupture position when rupture is to be brought about by a frictional effect.

The cross section of the guide tube for the piston, which can also be described as pressure tube, and of the piston accommodated therein can have different configurations. It can have a substantially rectangular or square configuration, in which case at least one side can also have a different configuration, and also a circular or oval configuration or a similar shape. The design of the rupture element and the shape of the associated side of the guide tube are therefore adapted to one another.

BRIEF DESCRIPTION OF DRAWINGS

Embodiments of the invention will be described in more detail hereinafter with reference to drawings.

FIG. 7 is a section through a further embodiment of the release element.

FIG. 8 is a section through a further embodiment of the release element.

FIG. 9 is a section through a further embodiment of the release element.

DETAILED DESCRIPTION OF THE INVENTION

Figure 1:
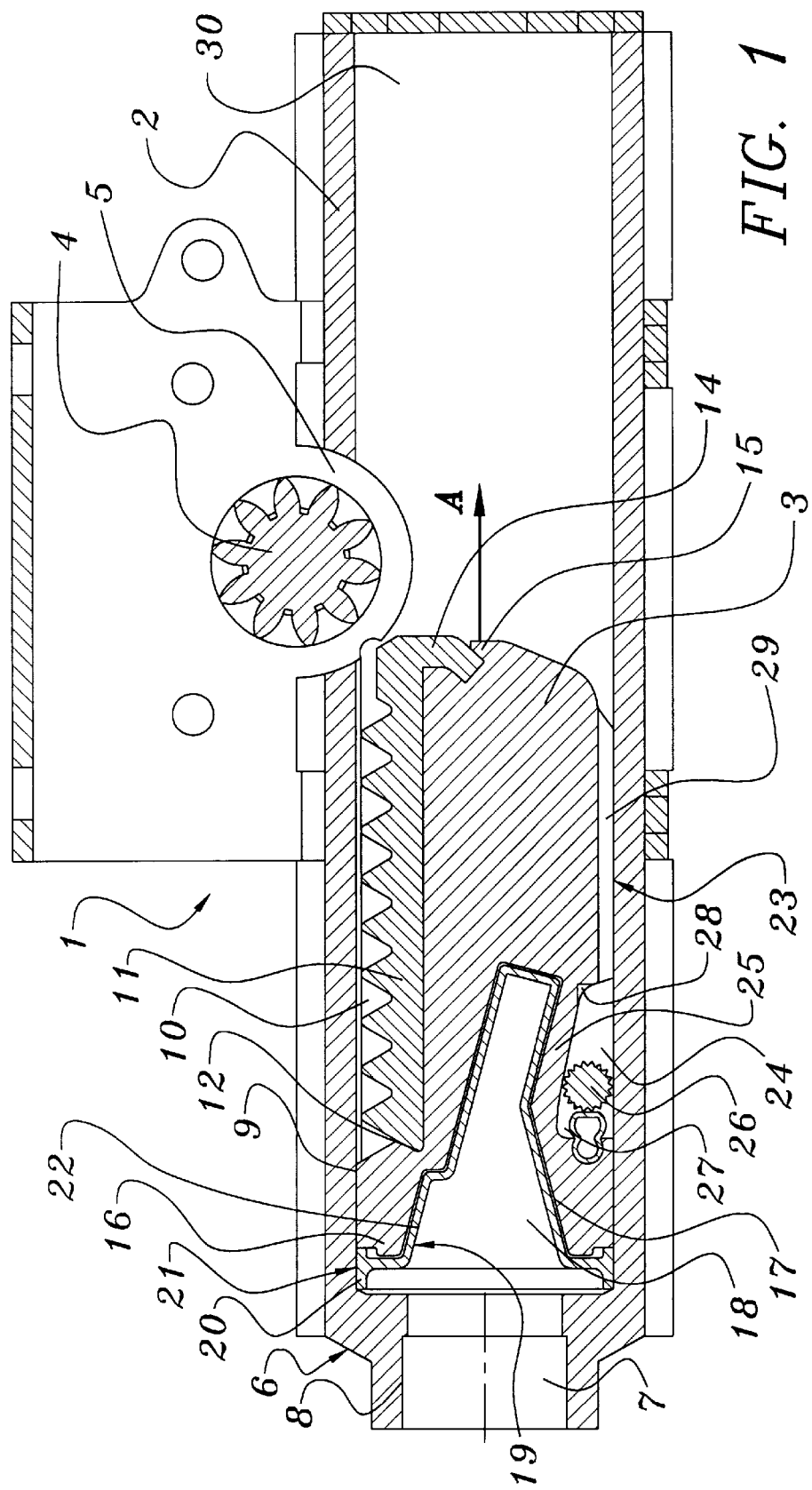
FIG. 1 is a longitudinal section through an embodiment of a piston drive according to the invention in a starting position.

An embodiment of a seat belt pretensioner according to the invention shown in FIG. 1 comprises a casing 1 with a guide tube 2 and a drive member or piston 3 accommodated displaceably therein. The casing is assembled with an automatic seat belt retractor (not shown) in such a way that a driven element such as, for example, a driven wheel or a pinion 4 which, as part of a movement transmitting system, is connected directly or via a gear to a spool of the automatic seat belt retractor, penetrates through an orifice 5 in the guide tube 2 into a path of movement of the piston 3 (the piston 3 moves in the direction of the arrow A).

In a starting or standby position according to FIG. 1, the piston 3 rests on a first end 6 of the guide tube 2 at which a propellant gas is produced or supplied. For this purpose, for example, a pyrotechnic gas generator 7 (only shown schematically) is arranged in a bore 8 at the first end 6 of the guide tube 2. The piston 3 and the guide lube 2 have a substantially rectangular and, in particular, square cross-sectional shape. The piston which is produced, for example, from aluminum, has, on its side which faces the pinion 4, also designated as upper side 9 in the illustration in FIG. 1, a recess 10 in which a rack 11 is fastened. The rack 11 comprises, for example, a plurality of adjacent segments, which are produced as precision punched steel parts. The rack 11 is fastened to the piston 3 on the one hand by a projection 12 of the rack 11 engaging in an associated indentation in the piston 3 and on the other hand by a holding piece 14 of the rack 11 which is held by a bent securing projection 15 of the piston.

At its end face 16 turned toward the gas generator 7, the piston 3 has a recessed piston head 17 with an internal recess 18 forming a pressure chamber for the propellant gas. A piston seal 19 is arranged on the end face 16 of the piston 3 and comprises a sealing rim 20 for sealing the piston against the internal wall 21 forming the internal periphery of the guide tube 2 and a sealing molding 22 which is adapted to the shape of the internal recess 18 in the piston head 17 and is placed thereon.

The piston 3 contains, on the side facing the rack 11, also designated as underside 23, adjacent to the internal recess 18 in the piston head 17, an external chamber 24 which is limited in the direction of the internal recess by a partition wall 25 and contains a release or rupture element 26 for breaking open the partition wall. The external chamber 24 comprises a first recessed bearing region 27 for the rupture element 26 which is designed, for example, as a substantially cylindrical knurled roller and of which the diameter is slightly smaller than the depth of the external chamber 24 in the bearing region 27. The partition wall 25 is inclined towards the longitudinal axis of the guide tube 2 so that the external chamber 24 tapers in the form of a wedge in the longitudinal cross section from the bearing region 27 in the drive and movement direction of the piston 3 (see direction of the arrow A) roughly to a stop 28 on the piston 3 from which a discharge duct 29 formed on the underside 23 of the piston 3 extends to a leading chamber 30 in the guide tube 2.

Figure 4:
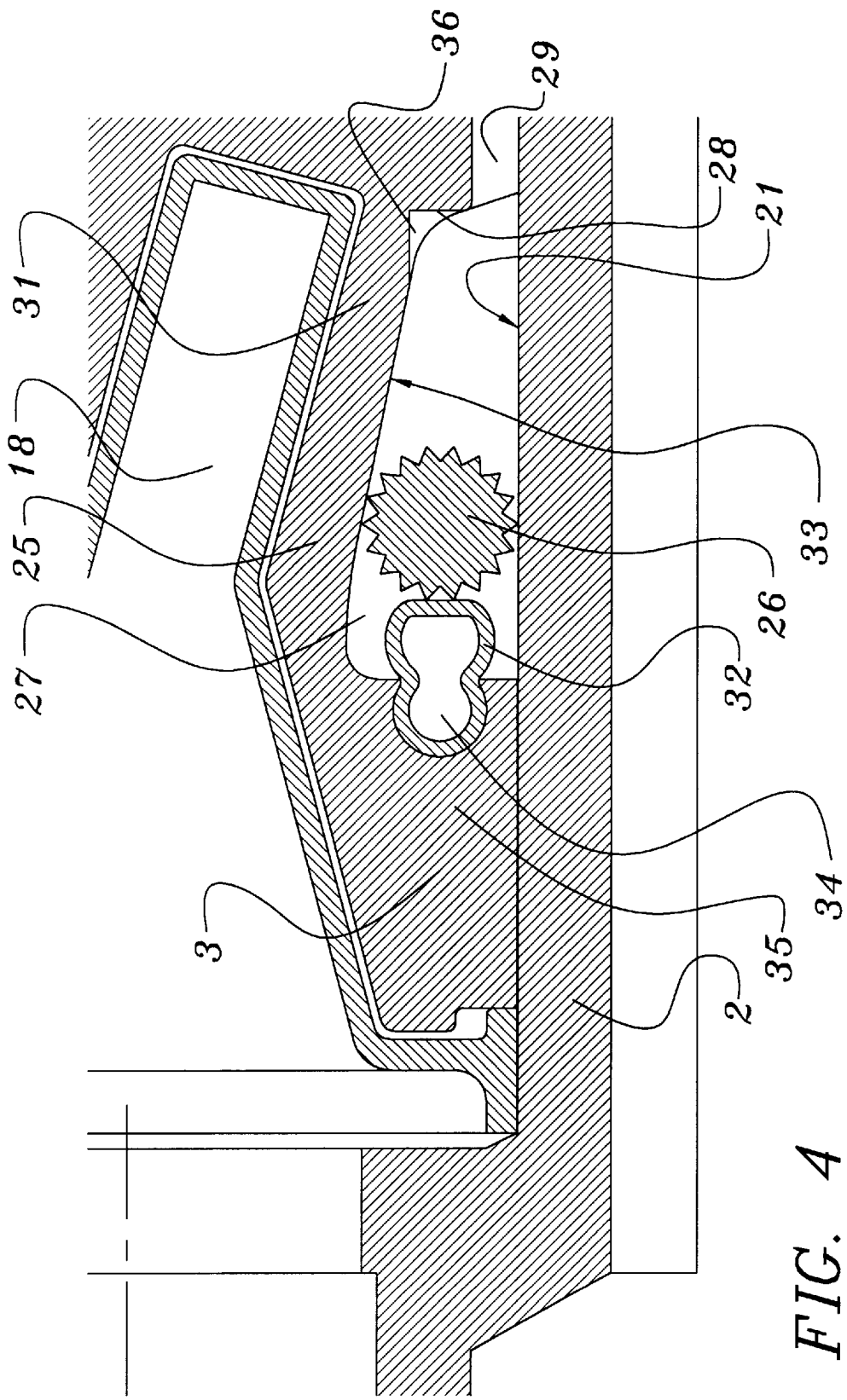
FIG. 4 is an enlarged detail from FIG. 1.

The partition wall 25 has a portion as rupture wall 31 (see FIG. 4). The rupture element 26 is pressed by a tensioning member 32 with a low tensioning force against the base 33 of the external chamber 24 and the internal wall 21 of the guide tube 2. The tensioning member 32 is, for example, a plastic molding which is fastened in an indentation 34 fastened in a wall portion 35 adjacent to the external chamber 24. The partition wall 25 is attenuated by a notch 36 in the indentation 34 that produces a set breaking point.

Figure 2:
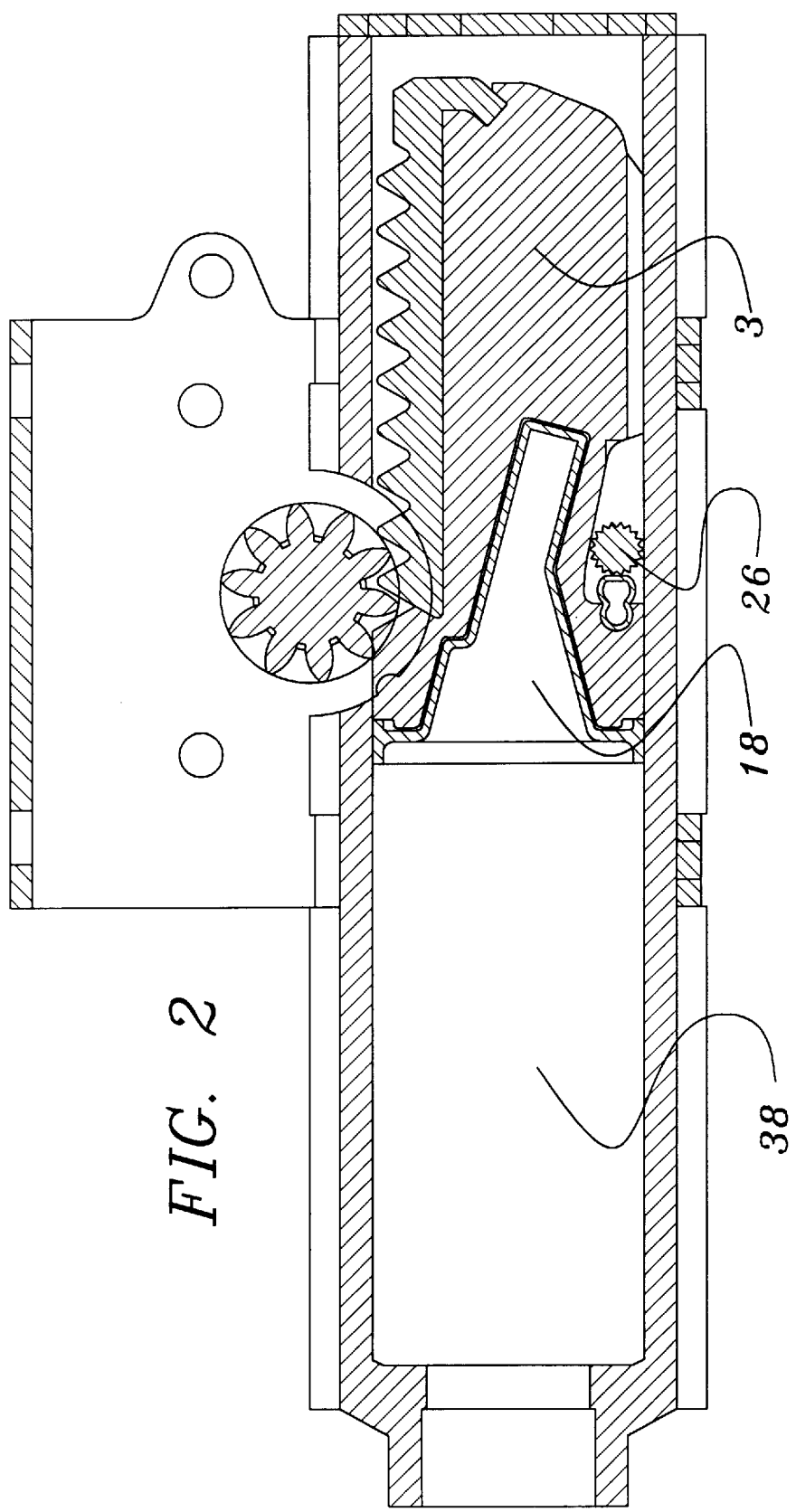
FIG. 2 is a view according to FIG. 1 of the piston drive in an end position.

After ignition of the gas generator 7 and liberation of the propellant gas or in general the introduction of the expanding propellant gas into the pressure chamber 18, the piston 3 is propelled forward in the direction of the arrow A in the guide tube 2. During its forward movement, the rack 11 engages the pinion 4 such that the latter is set in rotation and rotates the spool in the tightening direction. The tightener end position of the piston 3 is shown in FIG. 2. As a result of the expanded propellant gas, a high pressure prevails in the pressure chamber 18 and the expansion chamber 38 which is increasing as a result of piston movement. The rupture element 26 in the external chamber 24 has been expanded by the tensioning means 32 during the forward movement of the piston 3.

Figure 3:
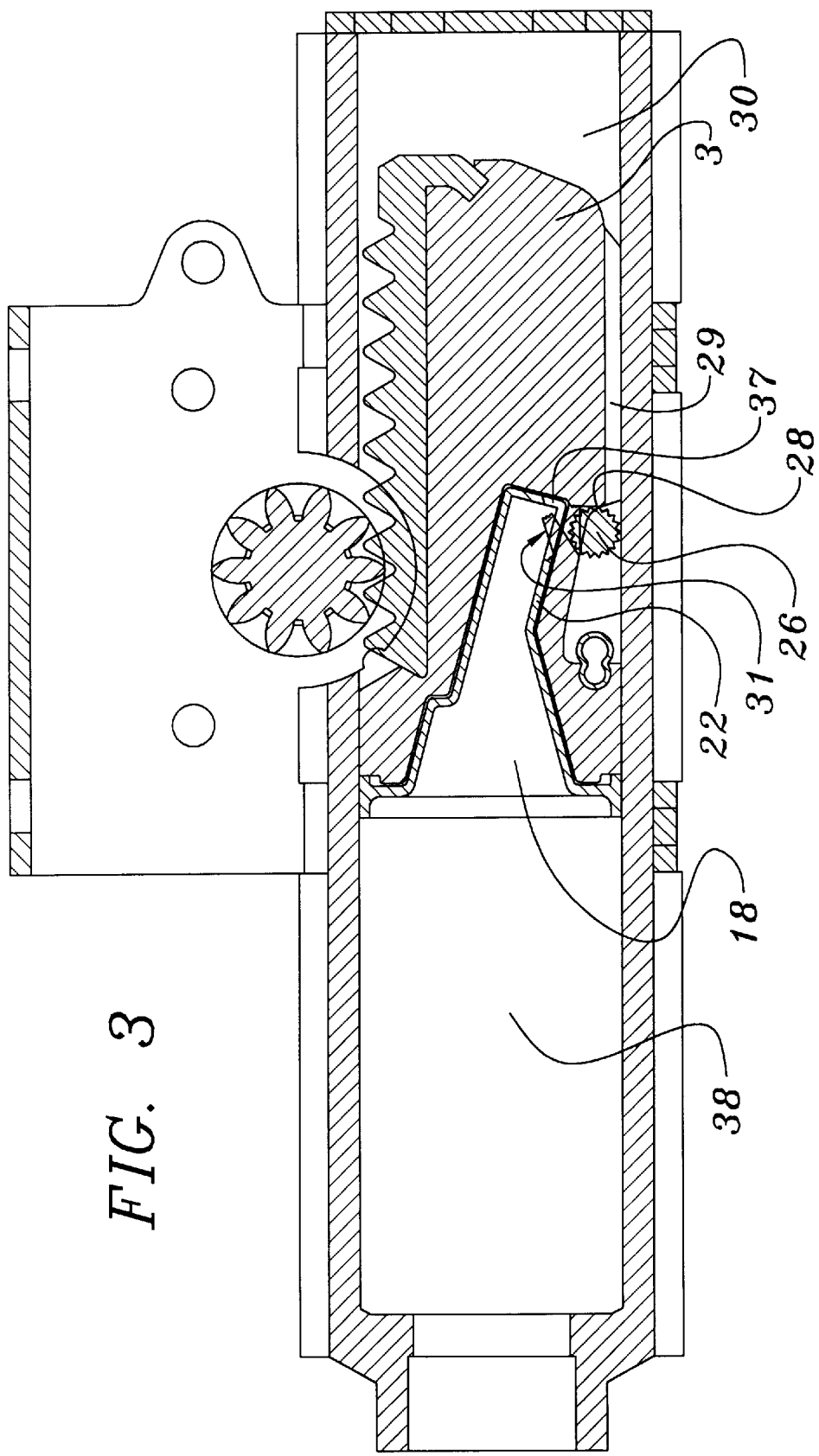
FIG. 3 is a view according to FIG. 1 of the retracted piston drive with a propellant gas discharge system opened by a release element.

When the piston 3 is moved back by a reversal of the pinion 4, the rupture element 26 is pressed into the wedge-shaped taper in contact with the internal wall 21 of the guide tube 2 and with the opposing base 33 of the external chamber 24 as a result of the friction at its periphery. The base 33 can be considered as a run-on ramp. As a result of the resistance of the rigid internal wall 21, however, the rupture element 26 is pressed against the rupture wall 31 and presses it inwardly into the internal recess 18 forming the pressure chamber (see FIG. 3). The sealing molding 22 is also torn open thereby, providing a discharge orifice 37 so that the propellant gas from the pressure and the expansion chamber 18 and 38 in the piston head 17 can escape via the discharge duct 29 into the leading chamber 30 of the guide tube 2 and from there via the orifice 5 at the pinion 4 or via additional orifices. The propellant gas pressure in the pressure and expansion chamber 18, 38 can therefore be reduced such that a further return movement of the piston 3 is not impeded as a result of the lack of a significant counteracting propellant gas pressure.

Figure 6:
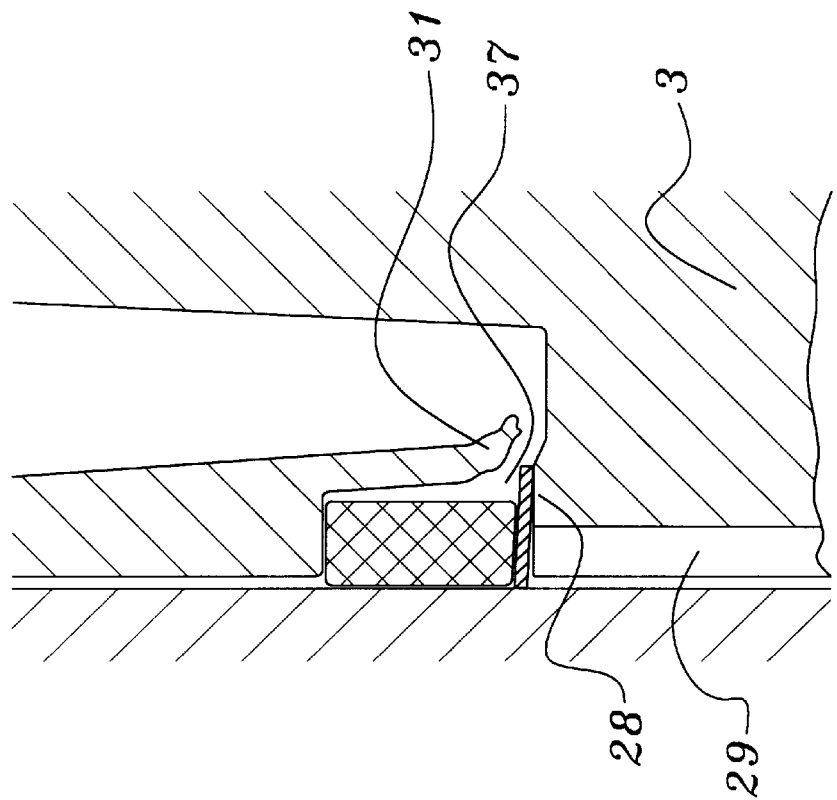
FIG. 6 is a section according to FIG. 4 through the release element in the rupture position.
Figure 5:
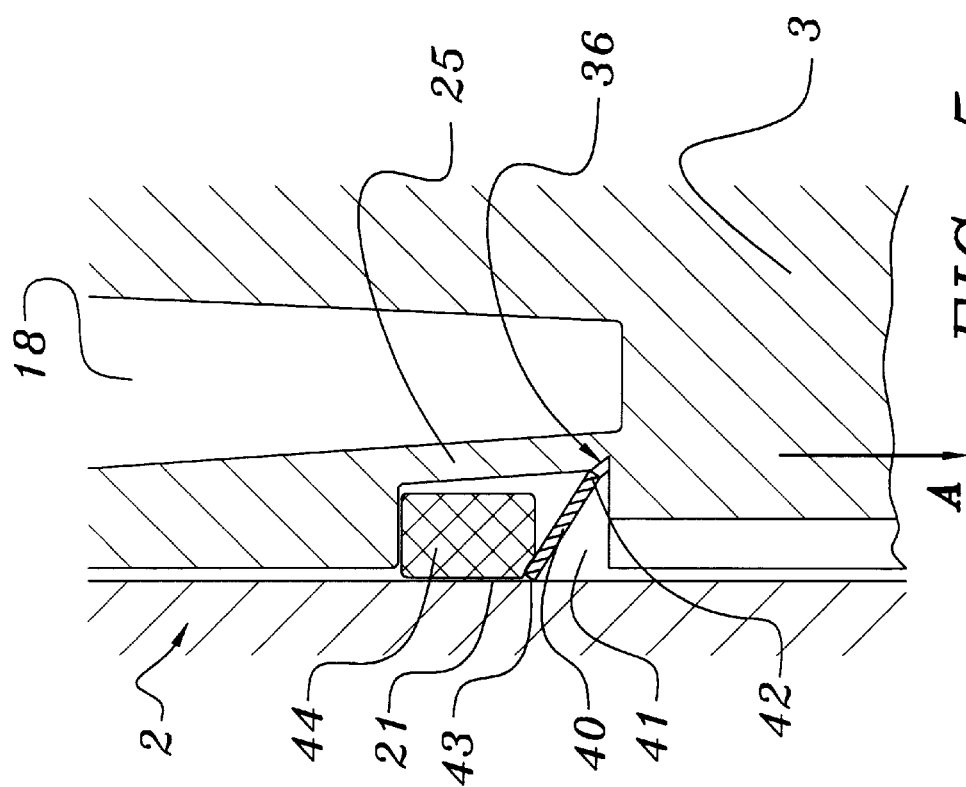
FIG. 5 is a side view of a further embodiment of a release element in the rest position.

FIGS. 5 and 6 show an alternative embodiment of a rupture element 40. This flat, substantially plate-shaped rupture element has a length (longitudinal dimension in the plane of the drawing) which is greater than the depth of the external chamber 41 at the notch 36 of the partition wall 25. The rupture element 40 which rests with its' internal end 42 in the notch is therefore inclined towards the internal wall 21 of the guide tube 2 in the external chamber 41, whereby the second, outer end 43 of the rupture element 40 is held by a tensioning means 44 (for example an elastic block) against the internal wall 21 of the guide tube 2. During a forward movement of the piston 3 (downward in the direction of the arrow A in FIG. 5), the second, outer end 43 of the rupture element 40 slides along the internal wall 21 of the guide tube 2. During a return movement of the piston 3 (see FIG. 6), the rupture element is placed by friction of the second end 43 on the internal wall 21 perpendicularly thereto and comes to lie against the stop 28 of the piston 3, the rupture wall 31 being broken open and a discharge orifice 37 being opened.

Further embodiments of rotationally symmetrical or roller-shaped rupture elements 26 with which the opening force for breaking open the partition wall 25 or the rupture wall 31 can be varied are shown in FIGS. 7, 8 and 9 (view in the direction of movement of the piston 3).

In the embodiment shown in FIG. 7, the rupture element 26 comprises two knurled edge regions 45 and a recessed central region 46. The partition wall 25 is secured substantially in the region of the edge regions with this rupture element.

In the embodiment in FIG. 8, the rupture element 26 is a cylindrical roller with knurling round its entire periphery.

With this rupture element, the partition wall 25 is first bent slightly on opening and is then sheared open, a force requirement which is somewhat greater than in the previous embodiment being required to break open the partition wall.

In the embodiment in FIG. 9, the rupture element is curved in a longitudinal cross section with diameters decreasing to the two axial ends. Therefore, the partition wall 25 is first subjected to bending stress and then to shearing stress. The force required for breaking open the partition wall and, therefore, the push-back force of the piston is therefore greater.

In general, each rupture element can comprise, instead of the knurling, surfaces which are also treated or roughened in a different manner and can produce the necessary friction on the wall surfaces to guarantee the mode of operation of the rupture element.

Many changes and modifications can, of course, be made in the above described embodiments without departing from the scope thereof. Accordingly, that scope is intended to be limited only by the scope of the appended claims.

What is claimed is:

1. A pretensioner for tightening a seat belt comprising:
   a piston-like drive member arranged in a guide tube,
   a drive means for producing a propellant gas which drives the drive member by expanding in a pressure and expansion chamber defined by the drive member,
   a movement transmitting system connecting the drive member and the seat belt to be tightened, and
   a discharge system with a release or rupture element which opens a discharge orifice in the drive member during a return movement of the drive member advanced by the propellant gas, the propellant gas under pressure in the pressure and expansion chamber issuing through the discharge orifice.

2. The pretensioner for tightening a seat belt according to claim 1 wherein the rupture element is accommodated in an external chamber of the drive member opened to an internal wall of the (guide tube and, during a return movement of the drive member through frictional engagement with the internal wall is brought into a release position in which the rupture element opens the discharge orifice by opening a partition wall.

3. The pretensioner for tightening a seat belt according to claim 2 wherein a portion of the partition wall forms a rupture wall, the breaking open of which opens the discharge orifice.

4. The pretensioner for tightening a seat belt according to claim 3 wherein the drive member is a piston with a recessed piston head which defines the pressure chamber and in that the partition wall separates the pressure chamber from the external chamber accommodating the rupture element.

5. The pretensioner for tightening a seat belt according to claim 2 wherein the drive member is a piston with a recessed piston head which defines the pressure chamber and in that the partition wall separates the pressure chamber from the external chamber accommodating the rupture element.

6. The pretensioner for tightening a seat belt according to claim 2 wherein the external chamber has a ramp-shaped base inclined towards the internal wall of the guide tube, between a first, recessed receiving chamber for the rupture element in a standby position and a second receiving chamber which leads in the direction of the forward movement of the piston, on a stop of the piston into which the rupture element is moved by frictional force during the return movement.

7. The pretensioner for tightening a seat belt according to claim 1 wherein the drive member is a piston with a recessed piston head which defines the pressure chamber and in that a partition wall separates the pressure chamber from a external chamber accommodating the rupture element.

8. The pretensioner for tightening a seat belt according to claim 1 wherein the guide tube and the drive member have a substantially circular cross section.

9. The pretensioner for tightening a seat belt according to claim 1 wherein the guide tube and the drive member have a substantially oval cross section.

10. The pretensioner for tightening a seat belt according to claim 1 wherein the guide tube and the drive member have a substantially rectangular cross section.

11. The pretensioner for tightening a seat belt according to claim 1 wherein the rupture element is a substantially cylindrical roller.

12. The pretensioner for tightening a seat belt according to claim 1 wherein the rupture element has a friction-increasing surface.

13. The pretensioner for tightening a seat belt according to claim 1 wherein the rupture element has a friction lining.

14. The pretensioner for tightening a seat belt according to claim 1 wherein the rupture element has a knurling.

* * * * *